(12) United States Patent
Swvigaradoss et al.

(10) Patent No.: US 12,197,435 B2
(45) Date of Patent: Jan. 14, 2025

(54) LOCALIZATION PROCEDURES AND PRIORITIZATION FOR APPLICATIONS

(71) Applicant: ServiceNow, Inc., Santa Clara, CA (US)

(72) Inventors: Jebakumar Mathuram Swvigaradoss, Santa Clara, CA (US); Ankit Goel, Santa Clara, CA (US); Srikar Bakka, Santa Clara, CA (US); Ankit Chauhan, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/905,452

(22) PCT Filed: Mar. 4, 2021

(86) PCT No.: PCT/US2021/020905
§ 371 (c)(1),
(2) Date: Sep. 1, 2022

(87) PCT Pub. No.: WO2021/178688
PCT Pub. Date: Sep. 10, 2021

(65) Prior Publication Data
US 2023/0148129 A1 May 11, 2023

(30) Foreign Application Priority Data
Mar. 5, 2020 (IN) .............................. 202011009549

(51) Int. Cl.
*G06F 16/00* (2019.01)
*G06F 16/2452* (2019.01)
*G06F 16/248* (2019.01)

(52) U.S. Cl.
CPC ........ *G06F 16/2452* (2019.01); *G06F 16/248* (2019.01)

(58) Field of Classification Search
CPC ........................... G06F 16/2452; G06F 16/248
USPC .................................................. 707/600–899
See application file for complete search history.

(56) References Cited

U.S. PATENT DOCUMENTS

| | | | |
|---|---|---|---|
| 6,609,122 | B1 | 8/2003 | Ensor |
| 6,678,887 | B1 | 1/2004 | Hallman |
| 7,020,706 | B2 | 3/2006 | Cates |
| 7,028,301 | B2 | 4/2006 | Ding |
| 7,062,683 | B2 | 6/2006 | Warpenburg |
| 7,131,037 | B1 | 10/2006 | LeFaive |

(Continued)

*Primary Examiner* — Michelle N Owyang
(74) *Attorney, Agent, or Firm* — Fletcher Yoder, PC

(57) ABSTRACT

A system includes a database containing database tables. The system also includes one or more processors configured to: (i) determine, for a software application, a set of the database tables containing information used by the software application; (ii) for an item associated with the software application, query the set of the database tables for entries related to the item, wherein the entries are in a first language; (iii) generate, for display, a representation of a first pane and a second pane, wherein the first pane contains the entries, and wherein the second pane contains data input elements for translations of the entries into a second language; (iv) transmit the representation; (v) receive data entered into the data input elements of the second pane; and (vi) store, in the set of the database tables, the data entered into the data input elements as a translation to the second language.

20 Claims, 13 Drawing Sheets

(56) References Cited

U.S. PATENT DOCUMENTS

| | | |
|---|---|---|
| 7,170,864 B2 | 1/2007 | Matharu |
| 7,610,512 B2 | 10/2009 | Gerber |
| 7,617,073 B2 | 11/2009 | Trinon |
| 7,721,271 B2 * | 5/2010 | Pournasseh ............. G06F 9/454 |
| | | 717/137 |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 8,983,982 B2 | 3/2015 | Rangaran |
| 9,065,783 B2 | 6/2015 | Ding |
| 9,122,552 B2 | 9/2015 | Whitney |
| 9,239,857 B2 | 1/2016 | Trinon |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,792,387 B2 | 10/2017 | George |
| 9,843,651 B1 * | 12/2017 | Wu ........................ G06F 9/454 |
| 2008/0281578 A1 | 11/2008 | Kumaran et al. |
| 2009/0132232 A1 * | 5/2009 | Trefler ................... G06Q 10/10 |
| | | 704/8 |
| 2010/0070843 A1 | 3/2010 | Duym |
| 2010/0211895 A1 * | 8/2010 | Mistry ................... G06Q 10/06 |
| | | 715/764 |
| 2011/0022381 A1 * | 1/2011 | Gao ........................ G06F 40/44 |
| | | 704/7 |
| 2012/0233200 A1 * | 9/2012 | Faegh .................... G06F 9/454 |
| | | 707/769 |
| 2013/0024760 A1 * | 1/2013 | Vogel ............... G06Q 10/06393 |
| | | 715/733 |
| 2016/0267074 A1 | 9/2016 | Nozue |
| 2017/0344538 A1 * | 11/2017 | Horai .................... G06F 9/454 |
| 2020/0401425 A1 * | 12/2020 | Wang .................... G06F 9/454 |

* cited by examiner

800A ENGLISH

BASIC INFORMATION 802A

- NAME: MYPHONE 8S
- SHORT DESC: MYPHONE 8S MOBILE DEVICE
- DESC: THE MYPHONE 8S IS NOT JUST BIGGER. IT IS BETTER IN EVERY WAY. A 4.7 INCH HD DISPLAY, AN ADVANCED 64-BIT CHIP WITH DESKTOP POWER, A NEW 8MP CAMERA, AND A FINGERPRINT ID SENSOR. ALSO COMES WITH SUPPORT FOR THE FASTEST WIFI AND 4G NETWORKS, ALL IN A SEAMLESS DESIGN

VARIABLE: COLOR 804A

QUESTION: COLOR

COLOR: CHOICES 806A

- TEXT: GOLD
- TEXT: SILVER
- TEXT: WHITE
- TEXT: BLACK

800B FRENCH — MACHINE TRANSLATE 808

BASIC INFORMATION 802B

- NAME: MYPHONE 8S
- SHORT DESC: APPAREIL MOBILE MYPHONE 8S
- DESC: LE MYPHONE 8S N'EST PAS JUSTE PLUS GRAND. C'EST MIEUX DE TOUTE FAÇON. UN ÉCRAN HD DE 4,7 POUCES, UNE PUCE DE 64 BITS AVANCÉE AVEC UNE PUISSANCE DE BUREAU, UNE NOUVELLE CAMÉRA 8MP ET UN CAPTEUR D'IDENTIFICATION D'EMPREINTE. FOURNIT ÉGALEMENT UN SUPPORT POUR LES RÉSEAUX WIFI ET 4G LES PLUS RAPIDES, LE TOUT DANS UNE CONCEPTION TRANSPARENTE

VARIABLE: COLOR 804B

QUESTION: COULEUR

COLOR: CHOICES 806B

- TEXT: OR
- TEXT: ARGENT
- TEXT: BLANC
- TEXT: NOIR

FIG. 8A

| DOCUMENT | TABLE NAME | LANGUAGE | STATUS | COUNT |
|---|---|---|---|---|
| CATALOG: CONSULTING REQUEST | SC_CAT_ITEM | FRENCH | PARTIAL | 2 |
| CATALOG: GROUPS MODS | ITEM_OPTION_NEW_SET | FRENCH | PARTIAL | 7 |
| CATALOG: ASK A QUESTION | QUESTION_CHOICE | FRENCH | PARTIAL | 5 |
| CATALOG: LAPTOP | SC_CAT_ITEM | GERMAN | PARTIAL | 3 |
| CATALOG: USB HEADSET | SC_CAT_ITEM | FRENCH | PARTIAL | 2 |
| CATALOG: TABLET | SC_CAT_ITEM | GERMAN | PARTIAL | 3 |
| CATALOG: DOMAIN CONTROLLER | SC_CAT_ITEM | FRENCH | PARTIAL | 4 |
| CATALOG: VIRTUAL MACHINE | SC_CAT_ITEM | GERMAN | PARTIAL | 2 |
| CATALOG: DESKTOP SETUP | SC_CAT_ITEM | FRENCH | PARTIAL | 9 |
| CATALOG: WORD PROCESSOR | SC_CAT_ITEM | FRENCH | PARTIAL | 2 |

LOCALIZATION PROCEDURES AND PRIORITIZATION FOR APPLICATIONS

CROSS-REFERENCE TO RELATED APPLICATIONS

This application is a 371 application of PCT Application No. PCT/US2021/020905, entitled "Improved Localization Procedures and Prioritization for Applications", and filed on Mar. 4, 2021; which claims priority to Indian patent application No. 2020110009549, entitled "Improved Localization Procedures and Prioritization for Applications" and filed on Mar. 5, 2020. The contents of each application is hereby incorporated herein in their entirety by reference.

BACKGROUND

Enterprise networks may provide users with access to web pages, applications, or other types of services with graphical user interfaces. These services may make use of various types of structured data, such as knowledgebase articles, incident reports, catalog items, virtual agent dialogs, and so on.

Localization refers to adapting text, language, and other aspects of this structured data for use in specific countries, regions, geographies, or cultures. For example, a knowledgebase article that is initially written in English should be translated to French before it is made available to French-speaking users. But there is currently is no consistent, reliable technique that can be used to localize structured data, as each type thereof may be arranged in different database storage structures. Further, there is no way to determine the overall localization status of the system and/or its individual applications.

SUMMARY

The embodiments herein provide a standardized localization process for structured data, regardless of application. These embodiments further provide dashboards on a graphical user interface that allow users to rapidly determine the locational status of the system. The dashboards may also recommend additional units of structured data for localization.

Accordingly, a first example embodiment may involve a database containing a plurality of database tables. The first example embodiment may also involve one or more processors configured to: (i) determine, for a software application operating on the system, a set of the database tables containing information used by the software application; (ii) for an item associated with the software application, query the set of the database tables for entries related to the item, wherein the entries related to the item are in a first language; (iii) generate, for display on a graphical user interface, a representation of a first pane and a second pane, wherein the first pane contains the entries related to the item in the first language, and wherein the second pane contains data input elements for translations of the entries related to the item into a second language; (iv) transmit, to a client device, the representation of the first pane and the second pane; (v) receive, from the client device, data entered into the data input elements of the second pane; and (vi) store, in the set of the database tables, the data entered into the data input elements as a translation to the second language of the entries related to the item.

A second example embodiment may involve determining, for a software application, a set of database tables containing information used by the software application. The second example embodiment may also involve, for an item associated with the software application, querying the set of database tables for entries related to the item, wherein the entries related to the item are in a first language. The second example embodiment may also involve generating, for display on a graphical user interface, a representation of a first pane and a second pane, wherein the first pane contains the entries related to the item in the first language, and wherein the second pane contains data input elements for translations of the entries related to the item into a second language. The second example embodiment may also involve transmitting, to a client device, the representation of the first pane and the second pane. The second example embodiment may also involve receiving, from the client device, data entered into the data input elements of the second pane. The second example embodiment may also involve storing, in the set of the database tables, the data entered into the data input elements as a translation to the second language of the entries related to the item.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8A depicts a graphical user interface for localization, in accordance with example embodiments.

FIG. 9B depicts a list of items recommended for localization, in accordance with example embodiments.

DETAILED DESCRIPTION

Figure 1:
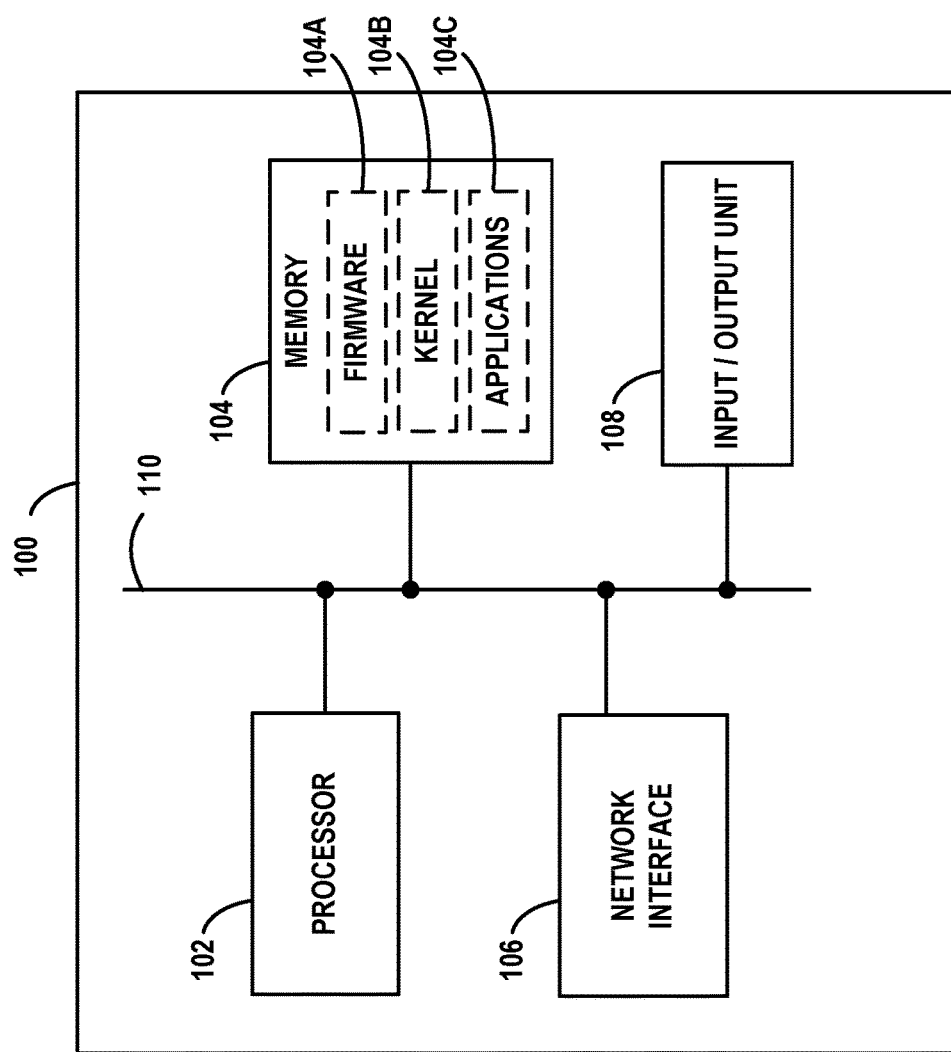
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
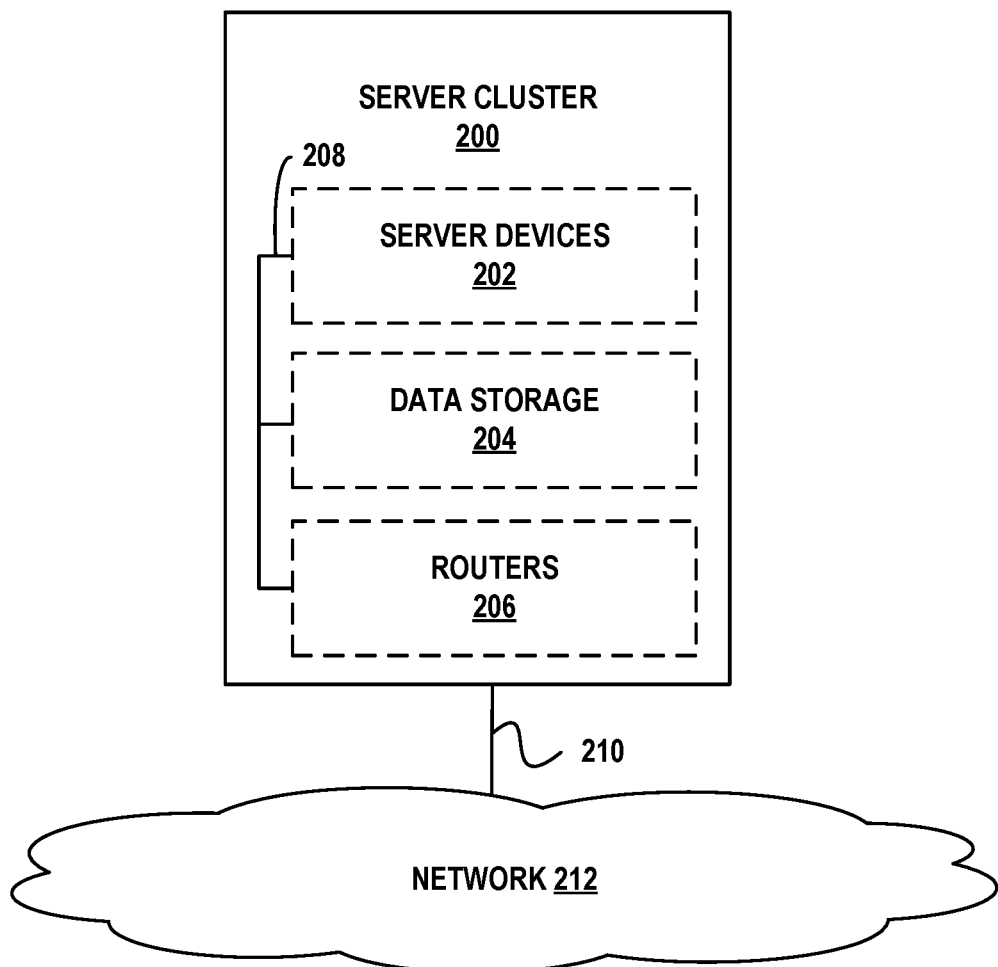
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
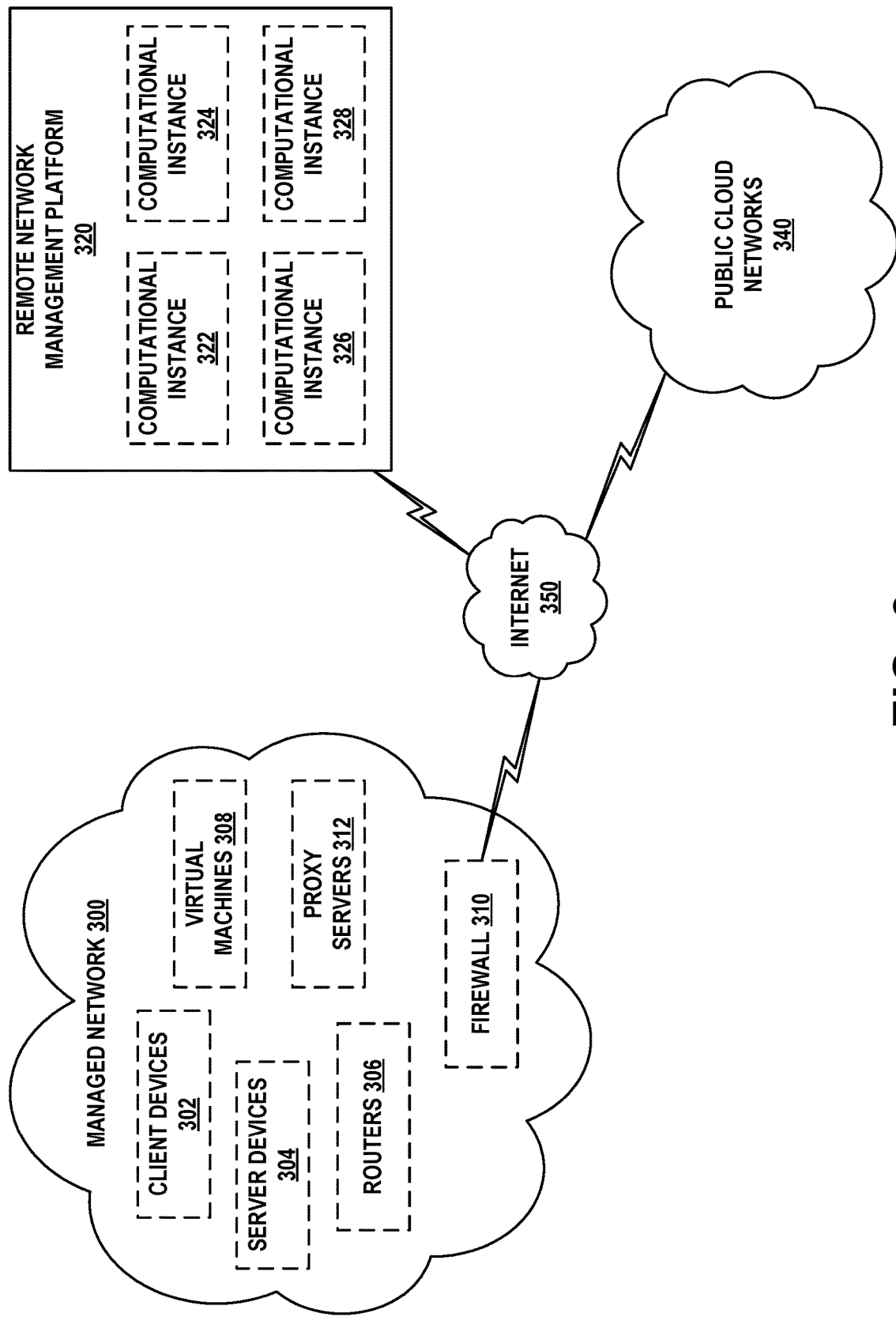
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
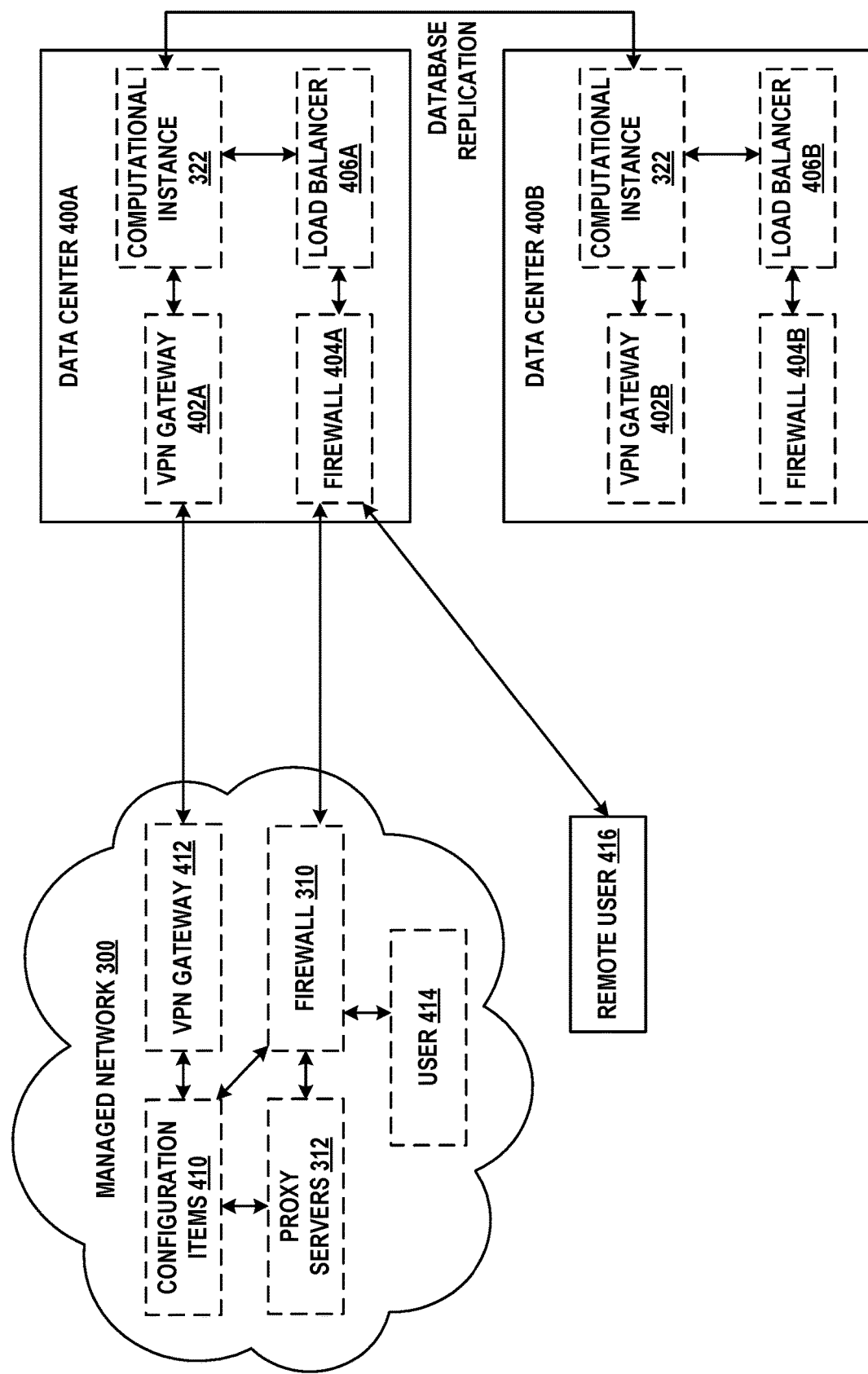
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
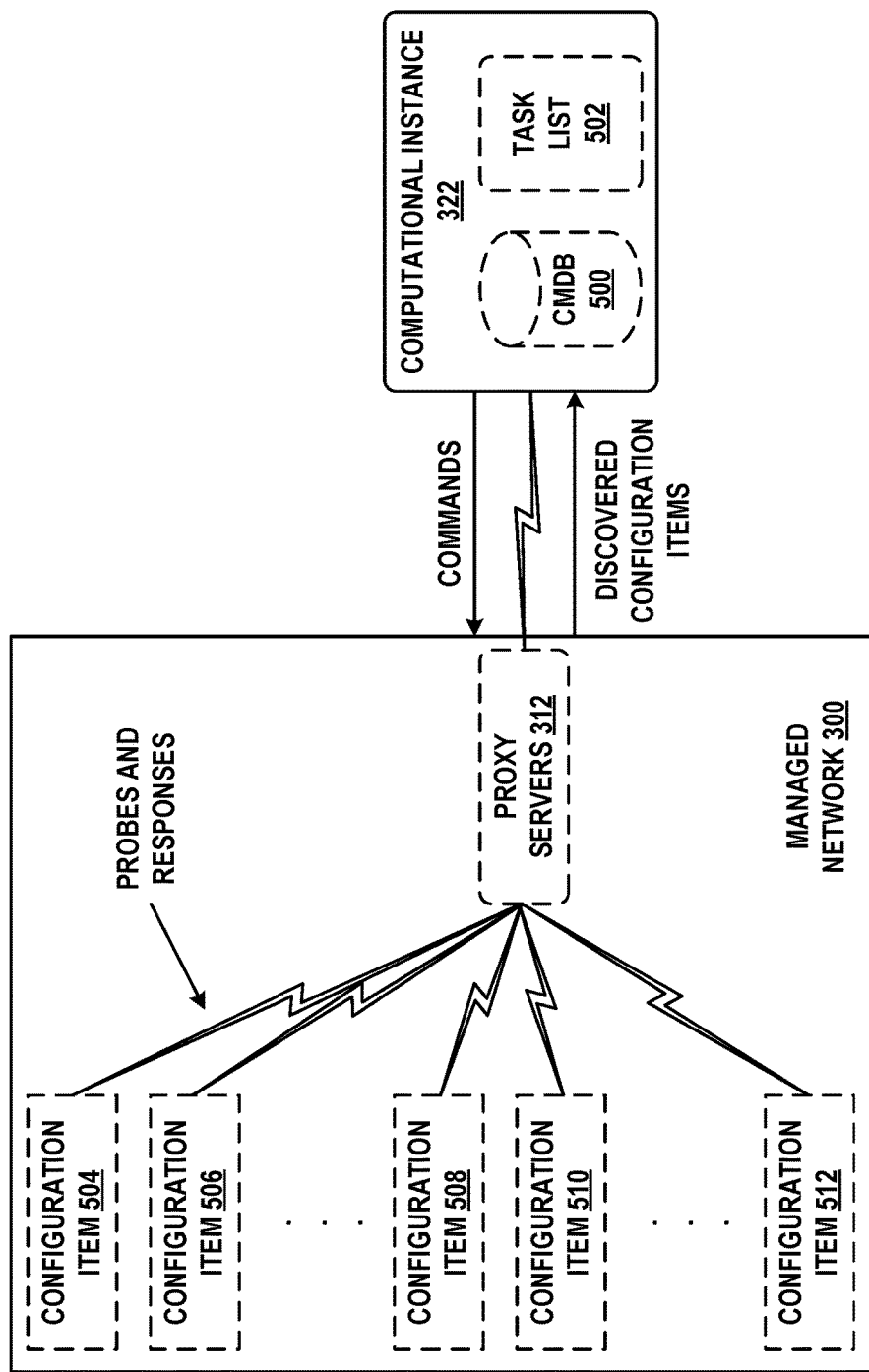
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
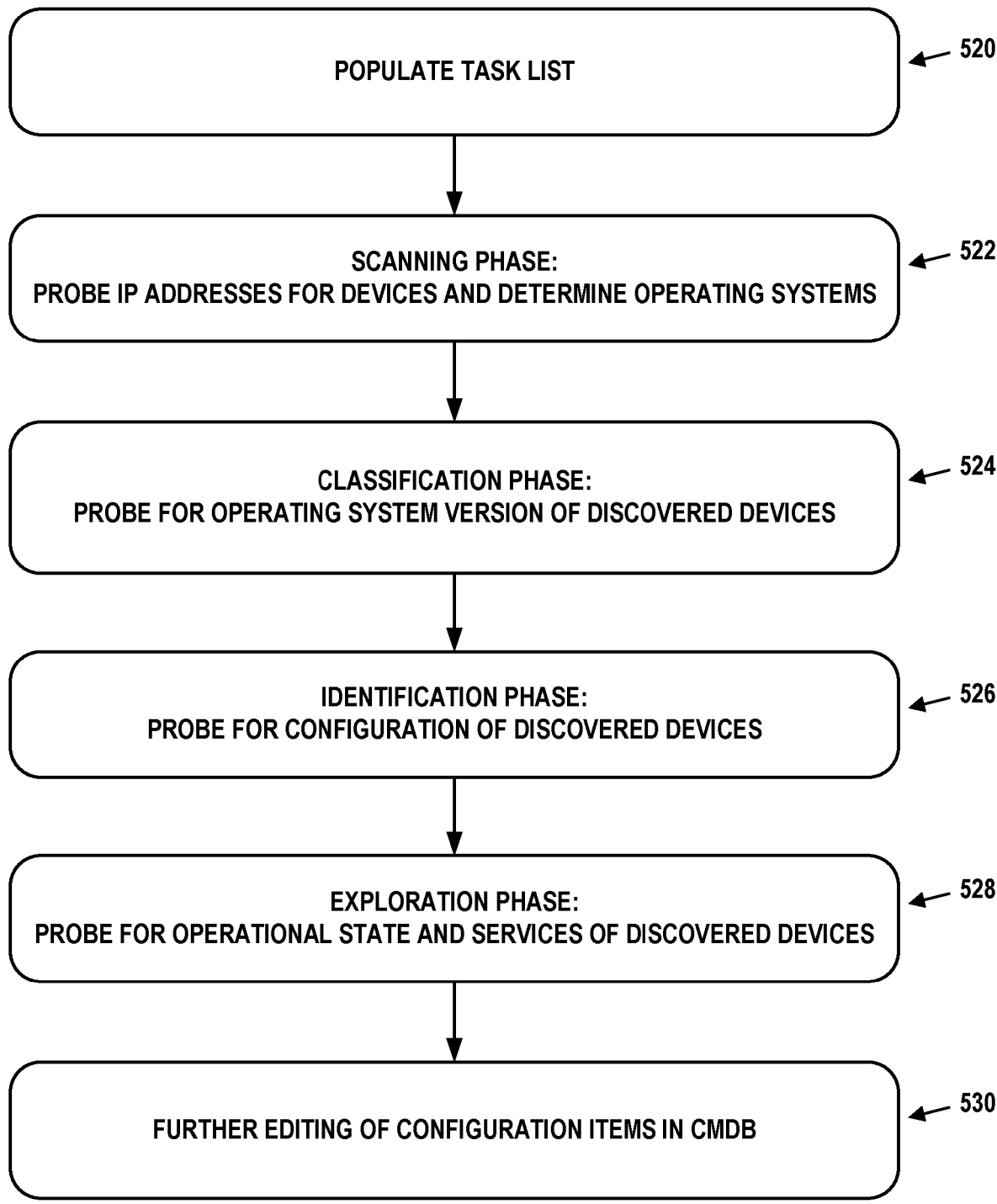
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Facilitating Localization

As noted previously, localization refers to adapting text, language, and other aspects of applications' structured data for use in specific countries, regions, geographies, or cultures. In a complex software system, such as a computational instance of a remote network management platform, localization can be a daunting task. Not only do translators seek to make accurate translations into local languages, specific technical and cultural contexts may be taken into account. Further, the information (e.g., text strings) that are to be translated may exist across multiple locations (e.g., different database tables) of the system. Thus, current localization efforts can be difficult, time-consuming, and prone to being incomplete in practice.

Figure 6:
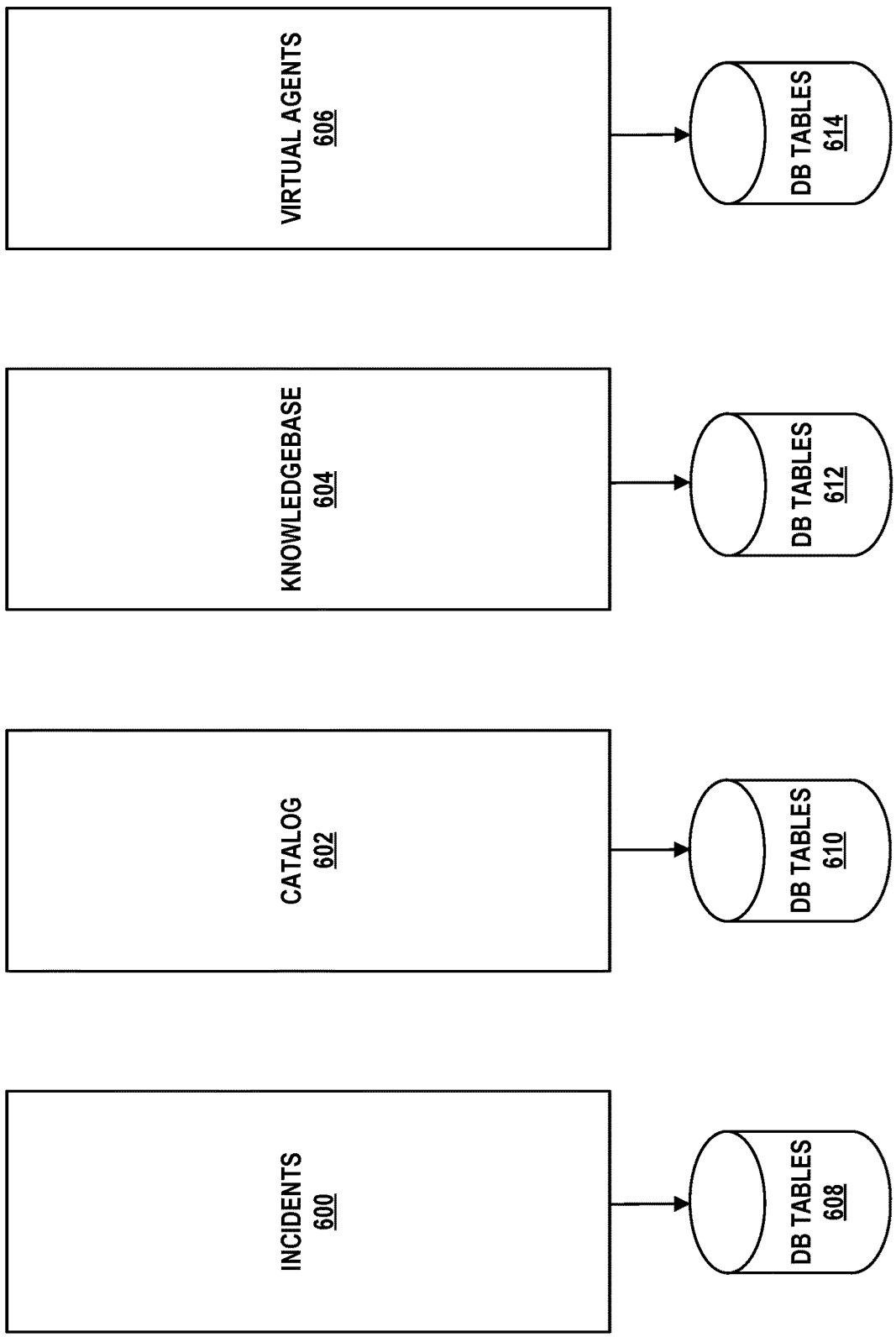
FIG. 6 depicts applications provided by a remote network management platform, in accordance with example embodiments.

As an example, FIG. 6 depicts four applications that may operate within a computational instance, such as computational instance 322. These include incidents 600, catalog 602, knowledgebase 604, and virtual agents 606. These applications are just examples, and further applications may be deployed on a computational instance.

Each of these applications also relies upon one or more database tables for its operations. The applications may store configuration parameters, user interface parameters, and entries in these tables. To that point, incidents 600 uses database tables 608, catalog 602 uses database tables 610, knowledgebase 604 uses database tables 612, and virtual agents 606 uses database tables 614. In some embodiments, tables may be dedicated to a particular application, while in other embodiments some applications may use some of the same tables.

Incidents 600 may be an application that facilitates the management of incident reports. These incident reports are often opened by IT users to describe a problem that they have experienced. Each incident report may also be referred to as a record. Incident reports may exist in various formats and contain various types of information, such as the name of an originator, a short description of the incident, a full description of the incident, a status of the incident, and an IT professional to whom the incident is assigned.

Catalog 602 may be an application that provides lists of equipment (e.g., laptops, phones, software) available to IT users, and provides ways in which these users can order the equipment. In doing so, catalog 602 may automate purchasing workflows and approvals.

Knowledgebase 604 may be an application that provides longer, pre-written guides or sets of instructions for addressing certain types of IT or enterprise problems. Often, many users have the same technology problems over and over, such as how to reset their enterprise passwords or how to access Wifi networks in various locations. Thus, IT personnel may write knowledgebase articles that address these issues. These articles may take the form of flat files, hyperlinked files, database content, or combinations thereof.

Virtual agents 606 may be an application that simulates a live human agent by using pre-defined or dynamically generated messages arranged in a conversation flow that is intended to answer a user's question or solve a user's problem. In some cases, all incoming chat requests may be initially answered by virtual agents that will either address the user's request or hand off the chat to a human agent.

Figure 7:
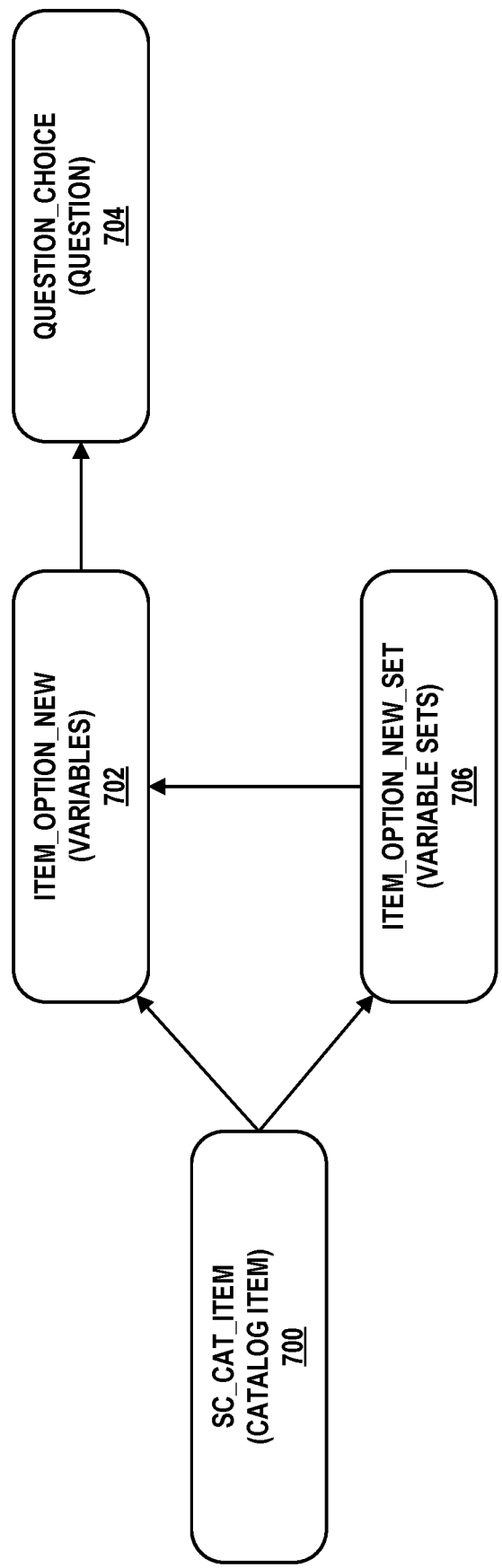
FIG. 7 depicts a partial database schema, in accordance with example embodiments.

As noted, each application may rely upon a unique combination of database tables to store its configuration and entries. FIG. 7 provides an example hierarchy of database tables for catalog 602. This hierarchy is somewhat simplified for purposes of illustration, and in practice may involve more tables and more complex relationships therebetween.

The sc_cat_item 700 includes entries for each catalog item. This table relies on the item_option_new 702 and item_option_new_set 706 tables for storing or referring to variables defined for each of these catalog items. Particularly, each entry in the item_option_new 702 table may contain a variable, while each entry in the item_option_new_set 706 table may be associated with a number of variables in the item_option_new 702 table. The variables may define questions for the user, which are stored in the question_choice table 704. In other embodiments, database tables associated with an application may include graphics, links, executable scripts and other information that may also require some form of localization.

The database table arrangement of FIG. 7 is just one example thereof, but motivates one of the difficulties of localization—information to be translated may exist in numerous tables. If a translator is to manually attempt localization, the translator may be unable to easily determine which tables are storing text strings that should be translated. Further, by having to navigate between these tables (by editing the database directly using SQL or by way of a user interface), the translator may lose the context of the information being translated, thus reducing the quality of the localization.

The embodiments herein overcome these limitations by automatically obtaining all relevant information for an item of structured data and presenting this information on one or more graphical user interfaces for a translator. This information may be obtained by traversing the database tables associated with the application and identifying all entries relevant to localization of the item. The columns and/or tables could also be manually selected. Alternatively, for each application, relevant columns of relevant tables may appear in metadata stored in files, non-relational databases, or in other types of documents. An example of such metadata in JSON format is shown below.

```
{
    "tableName": "sc_cat_item",
    "children": [{
        "tableName": "item_option_new",
        "children": [{
            "tableName": "question_choice"
        }]
    },
    {
        "tableName": "item_option_new_set",
        "children": [{
            "tableName": "item_option_new",
            "children": [{
                "tableName": "question_choice"
            }]
        }]
    }]
}
```

Regardless, these entries may be provided, in an organized fashion, on the graphical user interfaces to facilitate the localization. An example of this is shown in FIG. 8A. This figure depicts a graphical user interface that could be presented to an individual tasked with localization of a catalog item. In particular, the catalog item and its associated data may be in English, and the individual may be attempting to translate the catalog item and its associated data into French.

In order to make this localization task more efficient and complete, pane 800A of the graphical user interface may depict the catalog item and its associated data in English, and pane 800B may prompt the user to input the equivalent information in French. This side-by-side arrangement of pane 800A and 800B facilitates comparison of the translation from English to French. Thus, initially, the inputs in pane 800B may be blank. Alternatively, if translations of the information displayed in pane 800A are known (e.g., cached from a previous transaction), these translations may be automatically populated into the inputs of pane 800B.

To provide the information shown in the graphical user interface of FIG. 8A, the computational instance may traverse the database structure that was identified as being relevant (e.g., the structure depicted in FIG. 7 or a similar structure), and display this information in an organized fashion. For example, pane 800A includes information related to a particular catalog item (a MyPhone 8S mobile device) including basic information 802A, color variable 804A, and color choices 806A. The graphical layout may be user-defined, e.g., in a document object model (DOM), XML file, JavaScript object Notation (JSON) file, or in some other fashion.

Basic information 802A includes the name of the catalog item, its short description, and a longer full description. Color variable 804A and color choices 806A may work together to query the end user (customer) as to what color phone they would prefer (e.g., using a text string "Color?" provided by color variable 804A). Color choices 806A provide the options that would be presented to the end user (e.g., in a drop-down menu) including gold, silver, white, and black. Equivalent entries for the French translation appear in basic information 802B, color variable 804B, and color choices 806B of pane 800B.

The information about this catalog item that is shown in FIG. 8A is for purposes of illustration. In practice, the information may be much more extensive, defining questions asked of the end user, and text provided to the end user. For instance, after ordering the mobile device, the user may be sent an email with text confirming the purchase and stating "Your phone will be delivered in 2-3 days."

This additional information may include options for an amount of device memory, device data plan, cost center to be billed, whether the phone is replacing a lost or broken phone, a preferred phone number, purpose of the purchase, and so on. In a similar fashion, other types of applications (e.g., incidents 600, knowledgebase 604, or virtual agents 606) may have similarly complex information spread across a number of tables that can be presented in an organized fashion on a graphical user information not unlike that of FIG. 8A.

In the top right corner of FIG. 8A is button 808. Pressing, selecting, or otherwise activating the button may result in the translatable text (e.g., the text in boxes) of pane 800A being transmitting to a server device for machine translation. This server may be disposed within the remote network management platform, or may be an external service. Results from this machine translation may be populated in the appropriate text boxes of pane 800B. Such a machine translation may facilitate localization of the catalog item by providing an initial translation of the text, which can further be edited by a bilingual translator. Notably, machine translation is often not fully correct (e.g., missing valuable context or mistranslating colloquialisms) and manual editing of its output may be warranted.

Figure 8B:
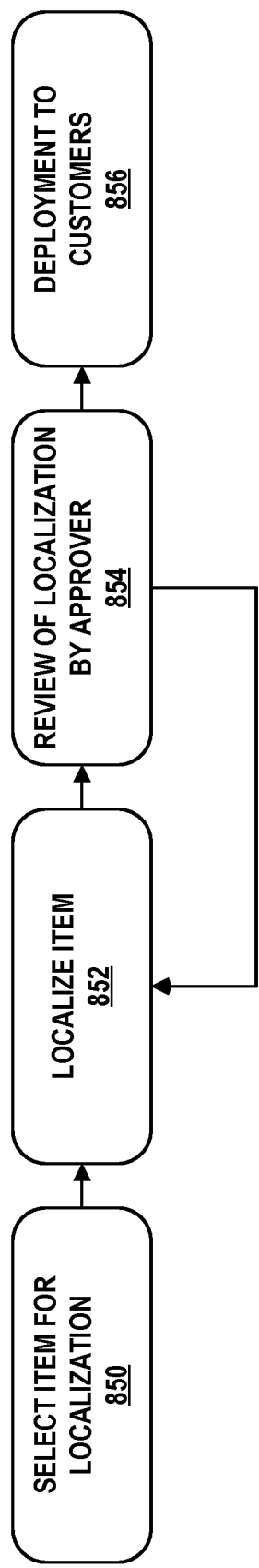
FIG. 8B depicts a localization approval workflow, in accordance with example embodiments.

The localization activities facilitated by the graphical user interface of FIG. 8A may be part of a localization workflow. An example of such a workflow is shown in FIG. 8B.

At step 850, an item is selected for localization. This may be a catalog item of catalog 602 as discussed above, or an incident report of incidents 600, an article of knowledgebase 604, or a virtual agent transaction or chat script of virtual agents 606. Keeping with the catalog item example, selection of the item at step 850 may trigger identification of database entries associated with the item, which may in turn involve traversing a number of database tables (e.g., for the catalog application, traversing the tables depicted in FIG. 7).

At step 852, this information is presented, to a first persona, for localization (e.g., from English to French). The presentation may be similar to that depicted in FIG. 8A, and may involve logically grouping sets of the information based on a pre-defined configuration. The first persona may be a translator, for example. Once the first persona completes the localization, he or she submits it for review and approval.

At step 854, the information and its localized version may be presented to a second persona for the review. The second persona may serve as a "second set of eyes" on the localization, and/or may be a senior individual who is experienced with localization procedures. If the second persona does not approve the localization, the item is returned to the first persona for further localization at step 852. If the second persona does approve the localization, the item is deployed to customers at step 856. A deployed item may be used by customers in production, e.g., as part of their workflows. Particularly, the deployed item may be saved to the appropriate database tables and may be accessed once an end user sets the locale of his or her computational instance or his or her personal locale to a particular language (e.g., English or French).

VI. Visualizing Localization

In addition to facilitating localization by determining text strings and other artifacts of an application that are candidates for localization, the embodiments herein provide graphical user interfaces to report on the status of localization per application, as well as to recommend further items for localization. While the graphical user interfaces presented herein employ certain arrangements of particular units of data, other arrangements of other units of data may be possible.

Figure 9A:
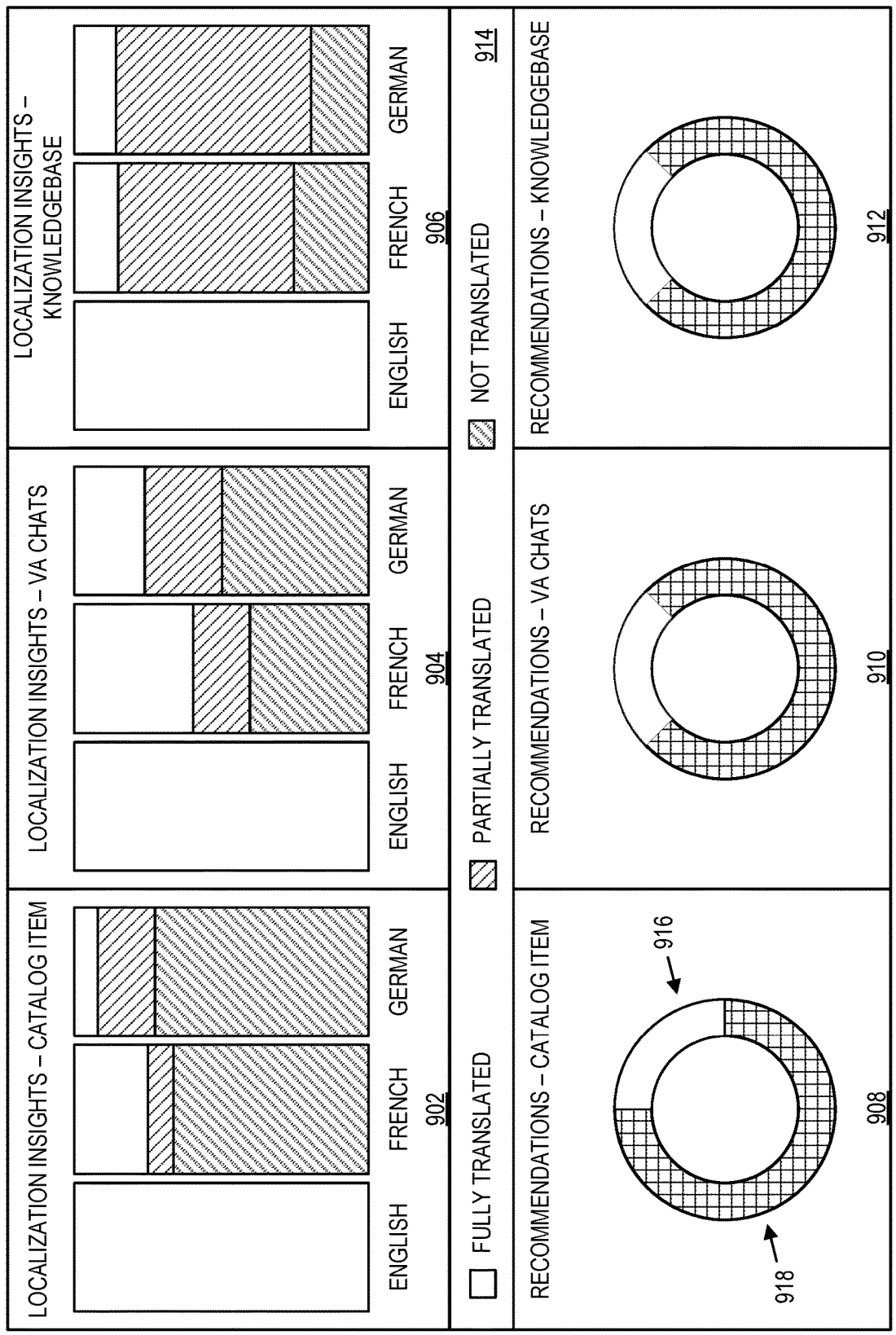
FIG. 9A depicts dashboards relating to localization, in accordance with example embodiments.

FIG. 9A depicts graphical user interface 900, which includes dashboards providing visual representations of localization statuses and recommended localizations. Dashboards 902, 904, and 906 represent the localization statuses of the catalog, virtual agent, and knowledgebase applications, respectively, for English, French, and German. The key to interpreting these charts is in pane 914.

For example, dashboard 902 indicates that all catalog items have been localized into English. However, more than half of these items have not been translated into French and/or German. Further, some catalog items are partially translated into French and/or German. Partial translations indicate that not all database entries associated with the item have been translated. For instance, in the context of FIG. 8A, this may mean that basic information 802A has been translated but color variable 804A and color choices 806A have not. From such an arrangement, a user can rapidly determine how well-localized each application is on a per-language basis.

Dashboards 908, 910, and 912 depict recommendations for further localization of the catalog, virtual agent, and knowledgebase applications, respectively, for all languages. For example, dashboard 908 represents recommended localizations 916 (the arc with no background) out of all information that can be localized across all languages. Remaining localizations 918 (the arc with a hashed background) are not currently recommended for localization.

An item may be recommended for localization based on attempted use. For instance, a count may be recorded when one or more users who are in a French-speaking locale or whose computational instance display is set to French request a particular item that is not localized to French or only partially localized to French. When this count exceeds a pre-determined threshold (e.g., 1, 2, 5, 10), the item may be marked as a recommended candidate for localization.

A user of graphical user interface 900 may click on or otherwise activate recommended localizations 916 to be presented with a list of these recommended candidates. Similar functionality may exist for the recommended localizations for the virtual agent and knowledgebase applications in dashboards 910 and 912, respectively.

To that point, FIG. 9B depicts graphical user interface 920 that could be presented to the user after the user clicks on or otherwise selects or activates recommended localizations 916. Graphical user interface 920 may include a list of catalog items and/or related information along with recommended localizations thereof. For instance, the catalog item laptop, appearing the fourth row of this table, may have been accessed from the sc_cat_item table, may be recommended for localization in German, and have a current localization status of partial. The count of 3 associated with this item may indicate that the item has been requested 3 times by end users with German locales. In cases where this item is also recommended for localization into French, another entry in the table of graphical user interface 920 may be present.

In this fashion, a user can focus on localizing catalog items (and with other application, other types of information) that have been requested in a non-localized or partially-localized language. This facilitates better use and prioritization of localization efforts.

VII. Example Operations

Figure 10:
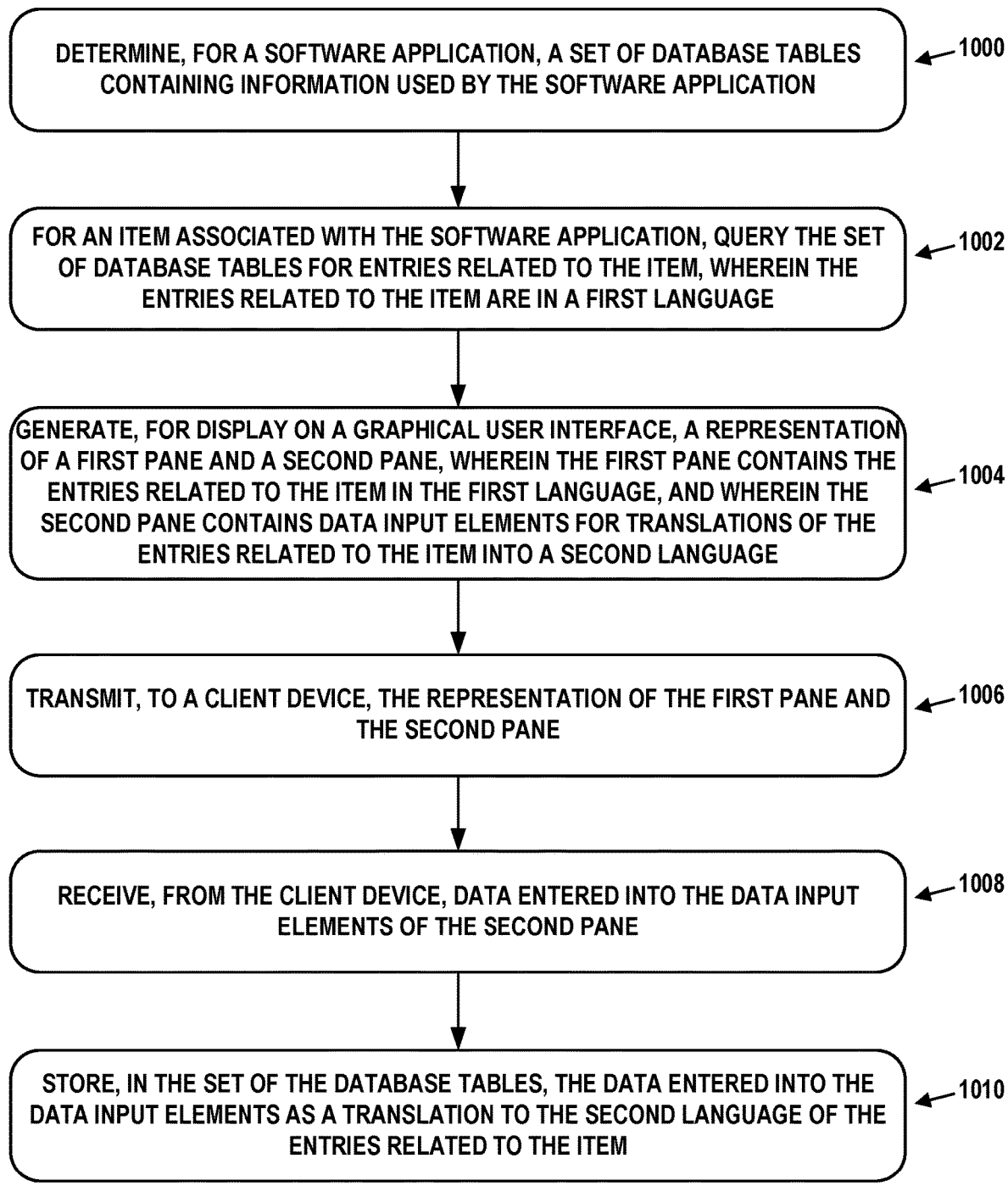
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or some other type of device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve determining, for a software application, a set of database tables containing information used by the software application.

Block 1002 may involve, for an item associated with the software application, querying the set of database tables for entries related to the item, wherein the entries related to the item are in a first language.

Block 1004 may involve generating, for display on a graphical user interface, a representation of a first pane and a second pane, wherein the first pane contains the entries related to the item in the first language, and wherein the second pane contains data input elements for translations of the entries related to the item into a second language. In some embodiments, one or more of the data input elements of the second pane may be blank. Some of these data input elements may be prepopulated with previous translations that have been cached or otherwise stored in the computational instance.

Block 1006 may involve transmitting, to a client device, the representation of the first pane and the second pane.

Block 1008 may involve receiving, from the client device, data entered into the data input elements of the second pane. The user may fill in any blank data input elements and/or edit any data input elements that have been prepopulated.

Block 1010 may involve storing, in the set of the database tables, the data entered into the data input elements as a translation to the second language of the entries related to the item.

In some embodiments, the software application is a catalog application and the item is a catalog item of the catalog application.

In some embodiments, the software application is an incident management application and the item is an incident report of the incident management application.

In some embodiments, the software application is a knowledgebase application and the item is an article of the knowledgebase application.

In some embodiments, the software application is a virtual agent application and the item is a chat script of the virtual agent application.

In some embodiments, determining the set of the database tables comprises obtaining a list of the set of the database tables from a user-provided configuration.

In some embodiments, the first pane and the second pane are arranged side-by-side on the graphical user interface.

In some embodiments, the entries related to the item are arranged in the first pane according to functionality or topics thereof.

Some embodiments may further involve: (i) transmitting, to a second client device, a representation of the entries related to the item and the translation; (ii) receiving, from the second client device, approval of the translation; and (iii) storing, in the set of the database tables, an indication that the translation is available for deployment to end users.

Some embodiments may further involve: (i) generating, for display on a second graphical user interface, a dashboard representing a localization status of the software application, wherein the localization status is based on an extent to which items related to the software application have been translated from the first language into the second language; and (ii) transmitting, to a further client device, a representation of the localization status. The localization status may depict amounts of the items related to the software application that are fully translated into the second language, partially translated into the second language, and not translated into the second language. The amounts may appear stacked in a bar chart.

Some embodiments may further involve generating, for display on a second graphical user interface, a dashboard representing localization recommendations for the software application, wherein the localization recommendations are for items related to the software application that: (i) are not translated into the second language, and (ii) have been requested in the second language.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a database containing a plurality of database tables; and
one or more processors configured to:
determine, for a software application operating on the system, a set of the database tables containing information used by the software application;
for an item associated with the software application, query the set of the database tables for entries related to the item, wherein the entries related to the item are in a first language;
generate, for display on a graphical user interface, a first pane and a second pane, wherein the first pane contains the entries related to the item in the first language, and wherein the second pane contains data input elements configured to receive data for translations of one or more entries of the entries related to the item into a second language;
transmit, to a client device, the first pane and the second pane;
receive, from the client device, the data entered into the data input elements of the second pane as a translation to the second language of the entries related to the item;
store, in the set of the database tables, the data entered into the data input elements; and
generate, for display on a second graphical user interface, a dashboard comprising one or more graphical representations, wherein at least one of the one or more graphical representations corresponds to a bar chart indicative of an extent to which items related to the software application have been translated from the first language into the second language.

2. The system of claim 1, wherein the software application is a catalog application and the item is a catalog item of the catalog application.

3. The system of claim 1, wherein the software application is an incident management application and the item is an incident report of the incident management application.

4. The system of claim 1, wherein the software application is a knowledgebase application and the item is an article of the knowledgebase application.

5. The system of claim 1, wherein the software application is a virtual agent application and the item is a chat script of the virtual agent application.

6. The system of claim 1, wherein determining the set of the database tables comprises obtaining a list of the set of the database tables from a user-provided configuration.

7. The system of claim 1, wherein the first pane and the second pane are arranged side-by-side on the graphical user interface.

8. The system of claim 1, wherein the entries related to the item are arranged in the first pane according to functionality or topics thereof.

9. The system of claim 1, wherein the one or more processors are further configured to:
transmit, to a second client device, a representation of the entries related to the item and the translation;
receive, from the second client device, approval of the translation; and
store, in the set of the database tables, an indication that the translation is available for deployment to end users.

10. The system of claim 1, wherein the dashboard comprises a localization status of the software application, and wherein the one or more processors are further configured to:
transmit, to a further client device, a representation of the localization status.

11. The system of claim 10, wherein the bar chart depicts amounts of the items related to the software application that are fully translated into the second language, partially translated into the second language, and not translated into the second language.

12. The system of claim 1, wherein another of the one or more graphical representations comprises:
localization recommendations for the software application, wherein the localization recommendations are for the items related to the software application that: (i) are not translated into the second language, and (ii) have been requested in the second language.

13. The system of claim 1, wherein the bar chart depicts amounts of the items related to the software application that are fully translated into the second language, partially translated into the second language, and not translated into the second language.

14. A computer-implemented method comprising:
determining, for a software application, a set of database tables containing information used by the software application;
for an item associated with the software application, querying the set of database tables for entries related to the item, wherein the entries related to the item are in a first language;
generating, for display on a graphical user interface, a first pane and a second pane, wherein the first pane contains the entries related to the item in the first language, and wherein the second pane contains data input elements configured to receive data for translations of one or more entries of the entries related to the item into a second language;
transmitting, to a client device, the first pane and the second pane;
receiving, from the client device, the data entered into the data input elements of the second pane as a translation to the second language of the entries related to the item;
storing, in the set of the database tables, the data entered into the data input elements; and
generating, for display on a second graphical user interface, a dashboard comprising one or more graphical representations, wherein at least one of the one or more graphical representations corresponds to a bar chart indicative of an extent to which items related to the software application have been translated from the first language into the second language.

15. The computer-implemented method of claim 14, wherein the first pane and the second pane are arranged side-by-side on the graphical user interface.

16. The computer-implemented method of claim 14, further comprising:
transmitting, to a second client device, a representation of the entries related to the item and the translation;
receiving, from the second client device, approval of the translation; and
storing, in the set of the database tables, an indication that the translation is available for deployment to end users.

17. The computer-implemented method of claim 14, wherein the bar chart is indicative of a localization status of the software application, the method further comprising:
transmitting, to a further client device, a representation of the localization status.

18. The computer-implemented method of claim 17, wherein the bar chart depicts amounts of the items related to the software application that are fully translated into the second language, partially translated into the second language, and not translated into the second language.

19. The computer-implemented method of claim 14, wherein another of the one or more graphical representations comprises:

localization recommendations for the software application, wherein the localization recommendations are for the items related to the software application that: (i) are not translated into the second language, and (ii) have been requested in the second language.

20. An article of manufacture including a non-transitory computer-readable medium, having stored thereon program instructions that, upon execution by a computing system, cause the computing system to perform operations comprising:

determining, for a software application operational on the computing system, a set of database tables containing information used by the software application;

for an item associated with the software application, querying the set of database tables for entries related to the item, wherein the entries related to the item are in a first language;

generating, for display on a graphical user interface, a first pane and a second pane, wherein the first pane contains the entries related to the item in the first language, and wherein the second pane contains data input elements configured to receive data for translations of one or more entries of the entries related to the item into a second language;

transmitting, to a client device, the first pane and the second pane;

receiving, from the client device, the data entered into the data input elements of the second pane as a translation to the second language of the entries related to the item;

storing, in the set of the database tables, the data entered into the data input elements; and generating, for display on a second graphical user interface, a dashboard comprising one or more graphical representations, wherein at least one of the one or more graphical representations corresponds to a bar chart indicative of an extent to which items related to the software application have been translated from the first language into the second language.

* * * * *